(12) United States Patent
Evans et al.

(10) Patent No.: US 7,949,675 B2
(45) Date of Patent: May 24, 2011

(54) DATA RETRIEVAL METHOD

(75) Inventors: Chris Evans, Bristol (GB); Martin Hogg, Bristol (GB); Paul Harry, Bristol (GB); Tony Barrett-Powell, Bristol (GB)

(73) Assignee: Oracle International Corporation, Redwood Shores, CA (US)

( * ) Notice: Subject to any disclaimer, the term of this patent is extended or adjusted under 35 U.S.C. 154(b) by 79 days.

(21) Appl. No.: 11/125,166

(22) Filed: May 10, 2005

(65) Prior Publication Data

US 2006/0085406 A1 Apr. 20, 2006

(30) Foreign Application Priority Data

Oct. 15, 2004 (GB) .................................. 0422979.5
Jan. 21, 2005 (GB) .................................. 0501343.8

(51) Int. Cl.
*G06F 17/30* (2006.01)
(52) U.S. Cl. ....................................................... 707/770
(58) Field of Classification Search .................. 707/1, 2, 707/3, 4, 5, 6, 7, 101, 770, 999.101
See application file for complete search history.

(56) References Cited

U.S. PATENT DOCUMENTS

| | | | | |
|---|---|---|---|---|
| 4,325,120 A | * | 4/1982 | Colley et al. | 711/202 |
| 5,933,830 A | * | 8/1999 | Williams | 707/100 |
| 5,978,577 A | * | 11/1999 | Rierden et al. | 707/10 |
| 6,023,694 A | * | 2/2000 | Kouchi et al. | 707/2 |
| 6,415,301 B1 | * | 7/2002 | Takahashi | 707/205 |
| 6,609,123 B1 | * | 8/2003 | Cazemier et al. | 707/4 |
| 6,611,838 B1 | * | 8/2003 | Ignat et al. | 707/101 |
| 6,631,382 B1 | * | 10/2003 | Kouchi et al. | 707/102 |
| 6,633,873 B1 | * | 10/2003 | Nakamura | 707/10 |
| 6,678,700 B1 | * | 1/2004 | Moore et al. | 707/200 |
| 6,691,069 B1 | * | 2/2004 | Mandin et al. | 702/187 |
| 6,741,982 B2 | * | 5/2004 | Soderstrom et al. | 707/3 |
| 6,771,626 B1 | * | 8/2004 | Golubiewski et al. | 370/336 |
| 6,901,403 B1 | * | 5/2005 | Bata et al. | 707/101 |
| 6,925,607 B2 | * | 8/2005 | Szlam et al. | 715/762 |
| 7,015,911 B2 | * | 3/2006 | Shaughnessy et al. | 345/440 |
| 7,073,133 B2 | * | 7/2006 | Hughes et al. | 715/765 |
| 7,107,285 B2 | * | 9/2006 | von Kaenel et al. | 707/104.1 |
| 2001/0049676 A1 | * | 12/2001 | Kepler et al. | 707/3 |
| 2002/0143774 A1 | * | 10/2002 | Vandersluis | 707/10 |
| 2003/0030672 A1 | * | 2/2003 | Hughes et al. | 345/765 |
| 2003/0037302 A1 | * | 2/2003 | Dzienis | 715/523 |
| 2003/0065737 A1 | * | 4/2003 | Aasman | 709/213 |

(Continued)

FOREIGN PATENT DOCUMENTS

EP 0216535 A3 4/1987

(Continued)

*Primary Examiner* — Luke S. Wassum
*Assistant Examiner* — Mohammed R Uddin
(74) *Attorney, Agent, or Firm* — Murphy & King, P.C.

(57) ABSTRACT

A method of retrieving data from any one of a plurality of data sources is disclosed. The data stored by each data source are arranged according to an associated data format. The method comprises: issuing a retrieval request for data stored on a designated one of the plurality of data sources to a control process; passing the retrieval request from the control process to the one a plurality of retrieval processes that is associated with the designated data source, said one of the retrieval processes retrieving the requested data from the designated data source and rearranging the retrieved data into a common output format, if it is not already in the common output format; and passing the data in the common output format to the control process.

13 Claims, 3 Drawing Sheets

U.S. PATENT DOCUMENTS

| | | |
|---|---|---|
| 2003/0158805 A1 | 8/2003 | Mozhdehi |
| 2003/0200230 A1 | 10/2003 | Ramanujam |
| 2004/0117358 A1* | 6/2004 | von Kaenel et al. ............... 707/3 |
| 2004/0230571 A1* | 11/2004 | Robertson ......................... 707/3 |
| 2005/0065941 A1* | 3/2005 | DeAngelis et al. ........... 707/100 |
| 2005/0086263 A1* | 4/2005 | Ngai et al. ................. 707/104.1 |
| 2005/0149496 A1* | 7/2005 | Mukherjee et al. ............... 707/3 |
| 2005/0165754 A1* | 7/2005 | Valliappan et al. ............... 707/3 |
| 2006/0212879 A1* | 9/2006 | Bennetto et al. ............... 719/328 |
| 2007/0022027 A1* | 1/2007 | Gupta et al. ..................... 705/35 |
| 2007/0050340 A1* | 3/2007 | von Kaenel et al. ............... 707/3 |
| 2008/0177716 A1* | 7/2008 | Hejlsberg et al. ................. 707/4 |

FOREIGN PATENT DOCUMENTS

| | | |
|---|---|---|
| EP | 1148432 A3 | 2/2005 |
| WO | 00/20985 A1 | 4/2000 |

* cited by examiner

Spreadsheet name: Employee Information
Sheet name: Employee Salary

|   | A | B | C | D | E |
|---|---|---|---|---|---|
| 1 | Employee ID | Employee Name | Job Title | Salary | Commission |
| 2 | 7369 | SMITH | CLERK | 800 | |
| 3 | 7499 | ALLEN | SALESMAN | 1600 | 300 |
| 4 | 7521 | WARD | SALESMAN | 1250 | 500 |
| 5 | 7566 | JONES | MANAGER | 2975 | |

Figure 3

Database name: ora10
Schema name: SCOTT
Table name: EMP

| EMP_ID | EMP_NAME | JOB | SAL | COMM |
|---|---|---|---|---|
| 7369 | SMITH | CLERK | 800 | |
| 7499 | ALLEN | SALESMAN | 1600 | 300 |
| 7521 | WARD | SALESMAN | 1250 | 500 |
| 7566 | JONES | MANAGER | 2975 | |

Figure 4

Company A

— Spreadsheet: Employee Information

— Sheet: Employee Salary

| Employee ID | Employee Name | Job Title | Salary | Commission |
|---|---|---|---|---|
| 7369 | SMITH | CLERK | 800 | |
| 7499 | ALLEN | SALESMAN | 1600 | 300 |
| 7521 | WARD | SALESMAN | 1250 | 500 |
| 7566 | JONES | MANAGER | 2975 | |

— Database Online Dictionary: ora10

— Schema: SCOTT

— Table: EMP

| EMP_ID | EMP_NAME | JOB | SAL | COMM |
|---|---|---|---|---|
| 7369 | SMITH | CLERK | 800 | |
| 7499 | ALLEN | SALESMAN | 1600 | 300 |
| 7521 | WARD | SALESMAN | 1250 | 500 |
| 7566 | JONES | MANAGER | 2975 | |

Figure 5

DATA RETRIEVAL METHOD

BACKGROUND OF THE INVENTION

1. Field of the Invention

The present invention relates to a method of data retrieval and to a system for performing such a method.

2. Description of the Related Art

Many software products have multiple sources for the metadata that they use. For example, the run-time metadata used by a business intelligence query tool may be drawn from a core repository stored in a database. However, some business intelligence tools have the capability to populate their core repository based on the contents of the core repository of an older version or of another product (for example a competitor's product) or based on metadata derived from the contents of a database's online dictionary.

However, a problem exists with this arrangement since the techniques used to retrieve data from these different sources of data are very different, and this results in inconsistent presentation of the data to the user and increase the complexity of the product. Furthermore, the data processing facilities that may be available for data from one of the sources may differ from those available to data from other sources.

SUMMARY OF THE INVENTION

As will be appreciated by those skilled in the art, a core repository is a store for storing a set of metadata that is associated with a software product. A business intelligence tool is a software product that assists a user in interpreting gathered data and in using that data in decision making processes.

According to one aspect of the present invention there is provided a method of retrieving data from any one of a plurality of data sources, the data stored by each data source being arranged according to an associated data format, the method comprising:
issuing a retrieval request for data stored on a designated one of the plurality of data sources to a control process;
passing the retrieval request from the control process to the one of a plurality of retrieval processes that is associated with the designated data source, said one of the retrieval processes retrieving the requested data from the designated data source and rearranging the retrieved data into a common output format, if it is not already in the common output format; and
passing the data in the common output format to the control process.

Thus, the invention solves the problem inherent with the prior art by rearranging or converting the data retrieved from each source into a desired common output format, if necessary, so that consistent processing and display of the data is possible. Accordingly, the user's experience in accessing data from these different sources is consistent, and the user is not aware that any transformation of data into a common representation is occurring.

The invention may operate on a variety of data formats. For example, it may use data stored in a spreadsheet, (such as Microsoft® Excel®), or it may use data stored in a database, for example database tables or views.

Typically, at least one of the data sources is a core repository stored within a relational database.

Further, at least one of the data sources may contain data representing an online dictionary of a relational database.

In one embodiment, the associated data format of one of the data sources relates to a previous version of a business intelligence tool, and the common output format relates to a current version of the business intelligence tool.

Advantageously, the associated data format of one of the data sources may relate to a first type of business intelligence tool, and the common output format may relate to a second type of business intelligence tool.

The data may be metadata, and in this case the common output format may be unified metadata.

Many different data structures may be used to represent the data retrieved from the data sources. The typical data structure which is used to display the common output format data is a tree. This allows the display of data from different data sources to be displayed in respective branches of the tree whilst the whole tree behaves coherently.

In accordance with a second aspect of the present invention, there is provided a system for retrieving data, the system comprising a processor connected to a plurality of data sources, each source storing data arranged according to an associated format, wherein the processor is adapted to:
i) issue a retrieval request for data stored on a designated one of the plurality of data sources to a control process;
ii) pass the retrieval request from the control process to the one of a plurality of retrieval processes that is associated with the designated data source, said one of the retrieval processes retrieving the requested data from the designated data source and rearranging the retrieved data into a common output format, if it is not already in the common output format; and
iii) pass the data in the common output format to the control process.

Typically, the data sources are hard discs.

The system may further comprise a display for displaying the retrieved data.

In accordance with a third aspect of the present invention, a computer program comprises computer program code means adapted to perform the steps of the first aspect of the invention when said program is run on a computer.

In accordance with a fourth aspect of the present invention, a computer program product comprises computer program code means adapted to perform the steps of the first aspect of the invention.

BRIEF DESCRIPTION OF THE DRAWINGS

An embodiment of the present invention will now be described with reference to the accompanying drawings, in which:

FIG. 3 shows sample data stored in an Excel® spreadsheet;

FIG. 4 shows sample data stored in an Oracle® database online dictionary; and

FIG. 5 shows the data of FIGS. 3 and 4 represented by a tree.

DETAILED DESCRIPTION OF THE INVENTION

Figure 1:
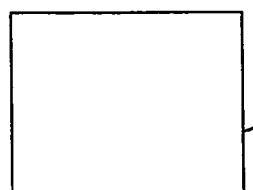
FIG. 1 shows a system on which the invention may be performed.

FIG. 1 shows a computer system capable of performing the invention in which a central processing unit 1 is connected to the hard disc 2 and display 3. The hard disc 2 stores metadata that is used by the embodiment of the invention, and this is processed by central processing unit 1 and displayed on display 3.

Metadata is a well known term in the art, and in a sense it is data that describes other functional data. For example, it may assign characteristics, such as user-friendly names, to data, and indeed it may indicate the purpose of the data and what processes can be performed on it.

Figure 2:
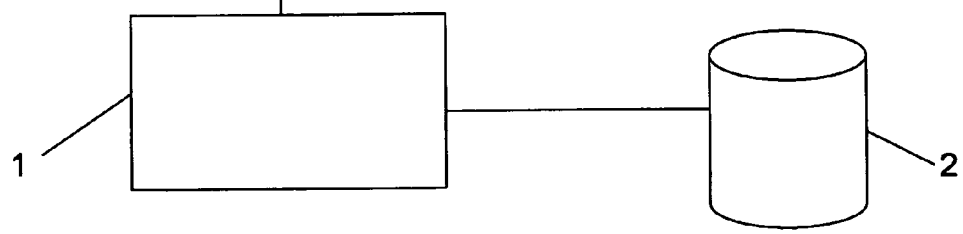
FIG. 2 shows the structure of an application programming interface for performing the invention.
Figure 2:
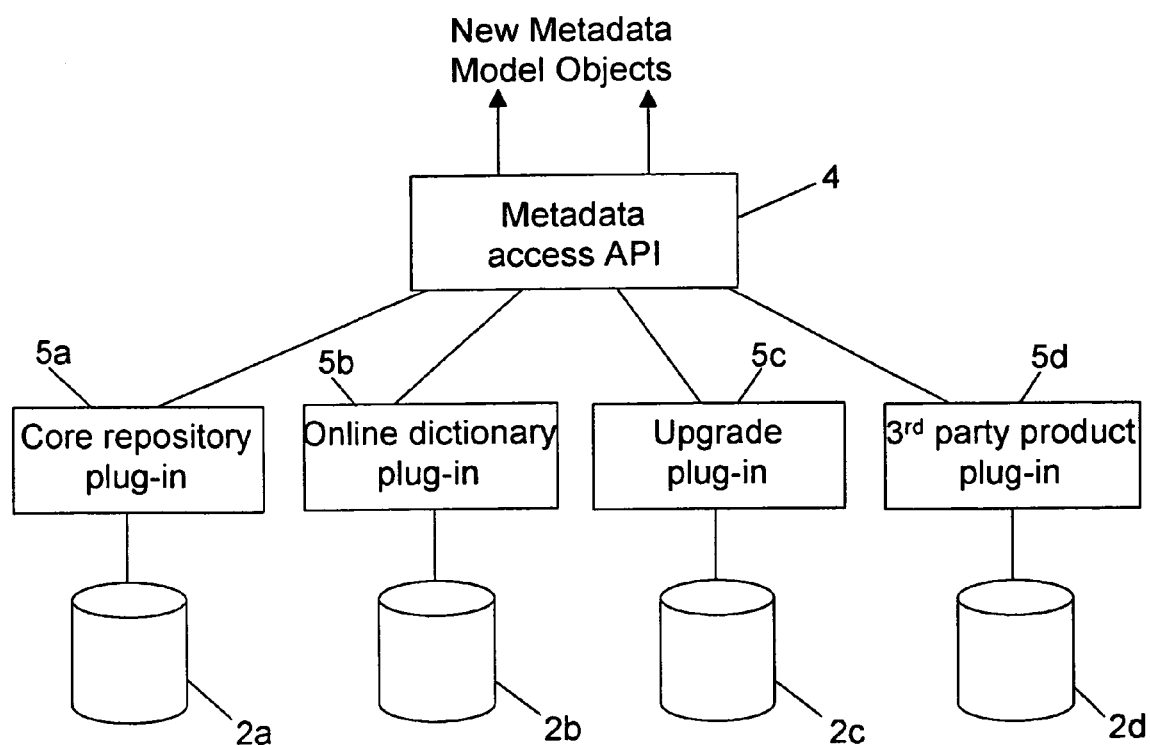

FIG. 2 shows four data sources 2a to 2d, each of which forms a part of hard disc 2. The data source 2a stores metadata relating to a core repository. The data source 2b stores metadata relating to the online dictionary of a relational database. The data source 2c stores metadata relating to the core repository that was created using a previous version of business intelligence software, and the data source 2d stores metadata relating to the core repository created using a third party product.

Retrieval and storage of metadata from any of the sources 2a to 2d is performed by a metadata access application programming interface (API) 4. When data is retrieved, this outputs the metadata in the form of unified metadata, and it provides a template for the required metadata format (i.e. unified metadata) from lower level software processes.

These lower level software processes are plug-ins 5a to 5d, each one being associated with a respective one of the sources 2a to 2d.

The core repository plug-in 5a performs no processing on the metadata retrieved or stored from the data source 2a since this is already in the desired format. Instead, it merely performs the necessary storage and retrieval of the data.

The online dictionary plug-in 5b normally operates as a read-only process although it could be a read/write process. It is operable to list the schemas present on the database by generating a corresponding list of folders, to convert a schema into a folder and to convert a database table or join definition into a unified metadata definition. The online dictionary plug-in 5b could also be operable to read cubes and dimensions.

The upgrade plug-in 5c again is normally read-only but could be a read/write process. It is operable to retrieve metadata from the core repository of an older business intelligence product and to convert these to the unified metadata format required by the API 4.

The third party product plug-in 5d is similar to the upgrade plug-in 5c but instead is operable to retrieve data from a third party product's data repository 2d.

As such, it is not necessary for any of the metadata stored in any of the data sources 2b to 2d to be used to populate the core repository of data source 2a in order that they can be read and operated upon, and by converting them into a unified metadata format, a consistent user interface is achieved for all the data from any source 2a to 2d, and consistent processing of the data can be performed.

The data output by API 4 can be processed by any subsequent software routine, for example to generate a display of a tree data structure representing the metadata in the respective data sources 2a to 2d, with each source of metadata being represented by a branch of the tree.

FIG. 3 shows part of a spreadsheet named "Employee Information". This spreadsheet contains a sheet with the name "Employee Salary". As its name suggest, this spreadsheet contains information relating to the employees of the company, and the sheet shown in FIG. 3 gives details of the employees' salaries. For instance, it can be seen from FIG. 3 that the Employee ID number 7369 has been assigned to the employee with the name "SMITH" whose job title is "CLERK" and salary is 800. There is no entry for this employee under the commission column.

FIG. 4 shows how the same data may be arranged in a table designated "EMP" in a Schema designated "SCOTT" or a database named "ora10". Only the column names have been changed with respect to those of FIG. 3 although the row and column designators 1 to 5 and A to E have been omitted as they are only used to indicate cells within the spreadsheet and are not required by the database.

FIG. 5 shows a representation of the data from the spreadsheet of FIG. 3 and the database table of FIG. 4 as a tree structure after it has been manipulated by software according to the invention. The tree is shown in its fully expanded form. However, on an initial presentation to a user it would be fully collapsed such that only the initial two branches, that is "Spreadsheet: Employee Information" and "Database Online Dictionary: ora10" are shown. The operation of the software in manipulating the data of FIGS. 3 and 4 to produce the tree structure of FIG. 5 will now be explained.

The spreadsheet data of FIG. 3 are managed by a plug-in known as the "Excel® Spreadsheet Plug-In" (not shown in FIG. 2). This plug-in forms an interface between the data source (in this case an Excel® Spreadsheet) and the metadata access API 4.

On initiation of the software, a retrieval request is passed to the metadata access API 4 for the root information for all available data sources. In this example, these data sources are the spreadsheet shown in FIG. 3 and the database table shown in FIG. 4. In response to this, the Excel® spreadsheet plug-in converts the name of the spreadsheet, that is "Employee Information" into the unified metadata format. In this instance, the unified metadata format may be a metadata directory. The retrieval request also causes the generation of a unique identifier for the spreadsheet.

In addition, the on-line dictionary plug-in 5b converts the name of the database, that is "ora10", stored on source 2b into the unified metadata format. Again, a metadata directory may be used. A unique identifier for the database is also generated.

These two items can then be displayed to the user as the first branches of the tree structure shown in FIG. 5, namely items "Spreadsheet: Employee Information" and "Database Online Dictionary: ora10".

The user may then cause a further retrieval request to be passed to the metadata access API 4 in order to retrieve the contents of the spreadsheet called "Employee Information" (which will be referred to using the previously obtained unique identifier). This will cause the Excel® spreadsheet plug-in to return a listing of all the sheets in the spreadsheet (in this case including the sheet named "Employee Salary"). The Excel® spreadsheet plug-in converts the sheet into a set of unified metadata format values (for example, metadata item folders), each representing one of the sheets in the spreadsheet and each having a unique identifier. This can then be displayed to the user as a list of these sheets within the spreadsheet, as shown in FIG. 5.

The user may wish to see the contents of the sheet "Employee Salary" within the "Employee Information" spreadsheet, and to do this he would select a sheet on the tree causing a retrieval request to be passed to the metadata access API 4. The metadata access API 4 would use the previously claimed unique identifier to cause the Excel® spreadsheet plug-in to return the information representing the structural contents of the sheet in a unified metadata format (for example a metadata item folder). Each column in the sheet will be converted to a unified metadata format, for example a metadata item, and information such as the heading and type of data may be included in the definition. The items are added as part of the item folder representation of the sheet. The items are then displayed as part of the tree shown in FIG. 5.

The user may also wish to view the contents of the database "ora10". To do so he would select this on the tree causing a retrieval request to be passed to the metadata access API 4 for the contents of the database "ora10" using the previously obtained unique identifier. This will cause the online dictionary plug-in 5*b* to return a list of schemas in the database. The online dictionary plug-in 5*b* converts the schema names into a set of unified metadata format values (for example metadata directories) representing each of the schemas in the database and each having a unique identifier, in this case a single value for a schema known as "SCOTT".

The tree will then be updated to display this list of schemas including the schema "SCOTT" shown in FIG. 5.

The user may select this schema to reveal the tables within it. This will cause a retrieval request to be passed to the metadata access API 4 using the previously obtained unique identifier and this will cause the online dictionary plug-in 5*b* to return a list of the tables in the schema. The online dictionary plug-in 5*b* converts the table names into a set of unified metadata format values, for example metadata item folders, each representing one of the tables in the database and each having a unique identifier, in this case a single value for table "EMP".

Finally, the user may reveal the contents of the table "EMP" by selecting it on the tree shown in FIG. 5 which causes a retrieval request to be passed to the metadata access API 4 using the previously obtained unique identifier and causing the online dictionary plug-in 5*b* to return the information without the table contents in the unified metadata format, for example a metadata item folder, representing the structural contents of the table. Each column in the table will be converted to the unified metadata format, for example a metadata item, and information such as the heading and type of data included in the item definition. The items are included as part of the item folder representation of the table, which is then displayed on the tree as shown in FIG. 5.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of media actually used to carry out distribution. Examples of computer readable media include recordable-type media such as floppy disks, a hard disk drive, RAM and CD-ROMs.

We claim:

1. A method of retrieving data from any one of a plurality of data sources, the data stored by each data source being arranged according to an associated data format, the method implemented in a computer system comprising a processor for executing program instructions, a storage device for storing program instructions to be executed by the processor and data to be processed by the processor, and program instructions to perform the method steps comprising:
   i) issuing a retrieval request for data stored on a designated one of the plurality of data sources to a control software process;
   ii) passing the retrieval request from the control software process to one of a plurality of retrieval software processes that is associated with the designated data source, each of the plurality of retrieval software processes being a different process than the control software process, said one of the retrieval software processes retrieving the requested data from the designated data source and rearranging, based on a type of the designated data source, the retrieved data into a common output format, wherein each one of the plurality of retrieval software processes is a plug-in software process; and
   iii) passing the data in the common output format to the control software process;
   wherein the common output format data is displayed as a tree in which selection of an item of common output format data causes steps i)-iii) to be performed using a unique identifier of the selected item of common output format data.

2. A method according to claim 1, wherein at least one of the data sources is a core repository stored within a relational database.

3. A method according to claim 1, wherein at least one of the data sources contains data representing an online dictionary of a relational database.

4. A method according to claim 1, wherein the associated data format of one of the data sources relates to a previous version of a business intelligence tool, and wherein the common output format relates to a current version of the business intelligence tool.

5. A method according to claim 1, wherein the associated data format of one of the data sources relates to a first type of business intelligence tool, and wherein the common output format relates to a second type of business intelligence tool.

6. A method according to claim 1, wherein the data are metadata.

7. A method according to claim 6, wherein the common output format is unified metadata.

8. A computer program product comprising computer readable storage media encoded with computer program code adapted to perform the steps of claim 1 when said program is run on a computer comprising a processor for executing the computer program code instructions and a storage device for storing the computer program code instructions to be executed by the processor and data to be processed by the processor.

9. The method of claim 1, wherein:
   when the designated data source is a core repository and the retrieval request is passed to a retrieval software process that is associated with the core repository, the retrieved data is already in the common output format,
   when the designated data source is an online dictionary and the retrieval request is passed to a retrieval software process that is associated with the online dictionary, the retrieved data is rearranged into the common output format by listing schemas present on the database by generating a corresponding list of folders, converting a schema into a folder, and converting a database table or join definition into a unified metadata definition in the common output format,
   when the designated data source is a core repository of an older business intelligence product and the retrieval request is passed to a retrieval software process that is associated with the core repository of older business intelligence product, the retrieved data is rearranged into the common output format by converting the data into the common output format, and
   when the designated data source is a third party product's data repository and the retrieval request is passed to a retrieval software process that is associated with the third party product's data repository, the retrieved data is rearranged into the common output format by converting the data into the common output format.

10. A system for retrieving data, the system connected to a plurality of data sources, each source storing data arranged according to an associated format, wherein the system comprises a processor executing program instructions, a storage device for storing program instructions executed by the processor and data processed by the processor, and the program instructions cause the system to:

i) issue a retrieval request for data stored on a designated one of the plurality of data sources to a control software process;

ii) pass the retrieval request from the control software process to one of a plurality of retrieval software processes that is associated with the designated data source, each of the plurality of retrieval software processes being a different process than the control process, said one of the retrieval software processes retrieving the requested data from the designated data source and rearranging, based on a type of the designated data source, the retrieved data into a common output format, wherein each one of the plurality of retrieval software processes is a plug-in software process; and iii) pass the data in the common output format to the control software process;

wherein the common output format data is displayed as a tree in which selection of an item of common output format data causes steps i)-iii) to be performed using a unique identifier of the selected item of common output format data.

11. A system according to claim 10, wherein the data sources are hard disks.

12. A system according to claim 10, wherein the system further comprises a display for displaying the retrieved data.

13. The system of claim 10, wherein:

when the designated data source is a core repository and the retrieval request is passed to a retrieval software process that is associated with the core repository, the retrieved data is already in the common output format, when the designated data source is an online dictionary and the retrieval request is passed to a retrieval software process that is associated with the online dictionary, the retrieved data is rearranged into the common output format by listing schemas present on the database by generating a corresponding list of folders, converting a schema into a folder, and converting a database table or join definition into a unified metadata definition in the common output format, when the designated data source is a core repository of an older business intelligence product and the retrieval request is passed to a retrieval software process that is associated with the core repository of older business intelligence product, the retrieved data is rearranged into the common output format by converting the data into the common output format, and when the designated data source is a third party product's data repository and the retrieval request is passed to a retrieval software process that is associated with the third party product's data repository, the retrieved data is rearranged into the common output format by converting the data into the common output format.

* * * * *